DAVID D. TUPPER.
Improvement in Machines for Jointing Staves.
No. 124,233.                   Patented March 5, 1872.
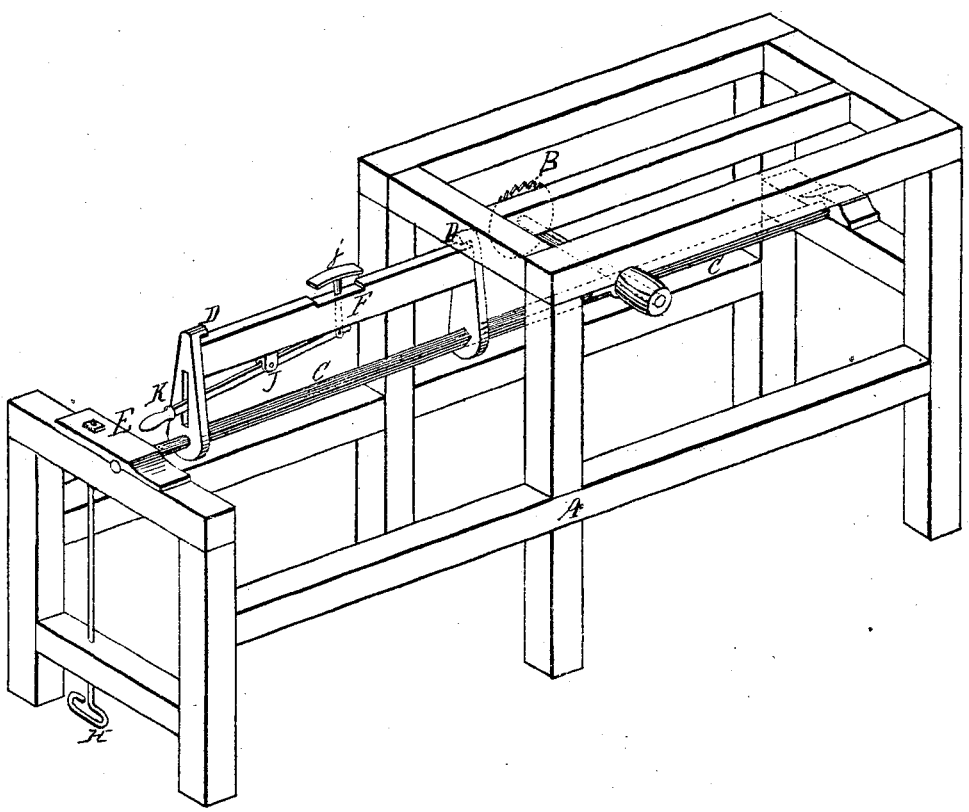
Witnesses.                         Inventor.

124,233

UNITED STATES PATENT OFFICE.

DAVID D. TUPPER, OF CANNING, CANADA, ASSIGNOR OF ONE-HALF HIS RIGHT TO DAVID M. DICKIE, OF CORNWALLIS, NOVA SCOTIA.

IMPROVEMENT IN MACHINES FOR JOINTING STAVES.

Specification forming part of Letters Patent No. 124,233, dated March 5, 1872.

I, DAVID D. TUPPER, an American citizen, residing in Canning, Kings county, Province of Nova Scotia and Dominion of Canada, have invented a certain Improvement in Machines for Jointing Staves, of which the following is a specification:

My invention relates to a square metal rotating bar placed under the saw on a line with the cut, in combination with the frame which rotates on the said bar in such a manner as to cause any part of either edge of the stave to be cut off with the saw, the object being to joint both edges of the stave by a straight cut in a line with the center of the required barrel or cask without taking it from the frame, and thereby giving both edges of the stave their proper bilges and bevels, and making the ends of equal widths.

The figure is a view of a machine embodying my invention.

A is the frame of the machine, which may be made of wood or other suitable material. B is a circular saw, with arbor and pulley attached to the frame A. C is a square iron or metal bar with round bearings at the ends, placed directly under the saw B, and on which the frame F swings and slides, said bar being held from rotating, and the frame from swinging by pressure on the foot-lever H, which holds it stationary while the frame slides past the saw. F is a frame attached to the rotating bar, having dogs D D at each end, and a lever, J, in the center. j is a presser-foot. D D are stationary dogs on each end of the frame F, for holding the ends of the staves while being jointed. J is a lever in the frame F, which bends the center of the stave upward to the shape of the bilge of the required cask or barrel, and holding it bent while it is passing the saw. E is the handle of the lever J, and is also used to slide the frame along the bar. K is a catch on the end of the frame F, to hold the lever down when required. H is a foot-lever, which clamps the end of the rotating bar C and keeps it stationary when required.

The mode of operating this jointer is as follows: Apply sufficient power to the circular saw to make it cut smooth, place the stave on the frame F by putting the ends under the dogs D D; then press down on the handle of the lever J till it comes under the catch K; then swing the frame to a proper position according to the width of the stave; press on the foot-lever H to hold the square bar from rotating; then slide the frame along the bar past the saw, making a straight cut along one edge of the stave; pull the frame back by the handle E; remove the pressure from the foot-lever; and swing the frame so that the saw will make a straight cut along the other edge of the stave in the same manner.

I hereby disclaim the use, broadly, of a rotating or oscillating bar on a line with the cut of the saw, combined with a frame for holding the stave in a proper position for the cut, as other machines have the same combination; but

What I claim, and desire to secure by Letters Patent of the United States, is—

The bar C, combined with the frame F, dogs D D, lever-bar J, operating the pressure-foot j, the catch K, foot-lever H, and saw B, all constructed substantially as and for the purpose specified.

Canning, Aug. 10, 1871.

DAVID D. TUPPER.

Witnesses:
JAMES TUPPER,
EDWIN RAND.